United States Patent Office 3,025,299
Patented Mar. 13, 1962

3,025,299
NEW CARBOSTYRIL DERIVATIVES
Rudolf Pfister and Franz Häfliger, Basel, Switzerland, assignors to Geigy Chemical Corporation, Ardsley, N.Y., a corporation of Delaware
No Drawing. Filed July 31, 1958, Ser. No. 752,206
Claims priority, application Switzerland Aug. 6, 1957
2 Claims. (Cl. 260—289)

The present invention concerns new carbostyril derivatives which have valuable pharmacological properties, as well as processes for the production of these compounds.

3-substituted 1-aryl-4-hydroxy-carbostyrils of the general formula:

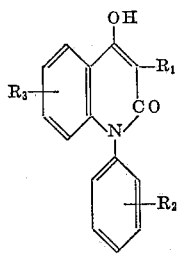

I wherein:

$R_1$ represents a member selected from the group consisting of an alkyl, mononuclear cycloalkyl, phenyl, lower alkylphenyl, lower alkoxyphenyl, chlorophenyl, bromophenyl, lower phenylalkyl, lower alkylphenylalkyl, lower alkoxyphenylalkyl, lower chlorophenylalkyl and lower bromophenylalkyl radicals, and $R_2$ and $R_3$ each represents a member selected from the group consisting of hydrogen, chlorine, bromine, lower alkyl and lower alkoxy groups, have not been known up to now.

It has now been found that such compounds can be produced from simple starting materials and that they unexpectedly have excellent pharmacological properties, in particular antiphlogistic, antipyretic and analgetic activity. They can be administered both parenterally and per os in particular to reduce pain and in the treatment of rheumatic disorders.

Compounds of the general formula defined above in which $R_2$ and $R_3$ are advantageously identical and are bound in the same relative position to the nitrogen atom, can be produced by heating a malonic acid ester of the general formula

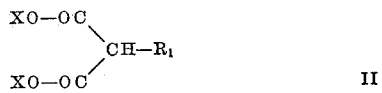

II wherein X represents a hydrocarbon radical, in particular a low molecular alkyl radical and $R_1$ has the meaning given above, with a diphenylamine of the general formula

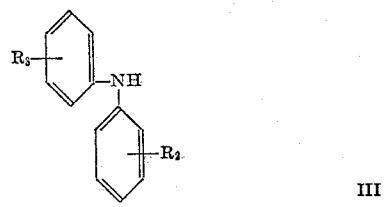

III wherein $R_2$ and $R_3$ have the meaning given above, until at least almost two mols of alcohol X—OH are liberated. To perform the reaction, equimolar amounts of the two components are heated for example for several hours at a bath temperature of about 250–270°, the liberated alcohol being distilled off. On reacting malonic acid esters with a low radical $R_1$, care should be taken by using a column cooled to such an extent that this starting material does not also pass over. Examples of malonic acid esters of the general formula II suitable for the reaction are: the methyl-, ethyl-, n-propyl-, isopropyl-, n-butyl-, isobutyl-, sec. butyl-, tert. butyl-, n-amyl-, isoamyl-, n-hexyl-, n-octyl-, [β-ethyl-hexyl]-, n-decyl-, n-dodecyl-, cyclopentyl-, cyclohexyl-, phenyl-, [p-chlorophenyl]-, [p-bromophenyl]-, o-toluyl, p-toluyl-, [p-methoxy-phenyl]-, benzyl-, [o-methyl-benzyl]-, [m-methyl-benzyl]-, [p-methyl-benzyl]-, [p-iso-propyl-benzyl]-, [p-chloro-benzyl]-, [p-bromo-benzyl]-, [β-phenylethyl]-, [γ-phenyl-propyl]- malonic acid diethyl esters and dimethyl esters. These can be reacted for example with diphenylamine, 2-methyl-, 3-methyl-, 4-methyl-, 2.2'-dimethyl-, 3.3'-dimethyl-, 4.4'-dimethyl-, 2.4.2'.4'-tetramethyl-, 2.2'-dimethyl-, 5.5'-isopropyl-, 2-chloro-, 3-chloro-, 4-chloro-, 2.4-dichloro-, 4.4'-dichloro-, 2.4.2'.4'-tetrachloro-, 4.4'-dibromo-, 2-methoxy-, 3-methoxy-, 3-ethoxy-, 4-methoxy-, 4-ethoxy-, 4-isobutoxy-, 2.2'-dimethoxy-, 4.4'-dimethoxy-, 3-methoxy-2'-methyl- and 4-methoxy-4'-chloro- diphenylamine.

In addition, the carbostyril derivatives of the general formula I can also be produced by treating N-acyl-N-aryl-anthranilic acid esters of the general formula:

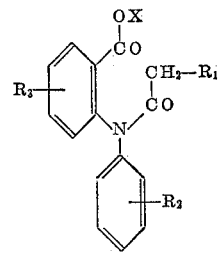

IV wherein $R_1$, $R_2$, $R_3$ and X have the meanings given above, with an alkaline condensing agent. By this process, compounds having radicals $R_2$ and $R_3$ which are different from each other and/or are in different positions with regard to the nitrogen atom are equally easily produced as compounds having identical radicals $R_2$ and $R_3$ which are equally distant from the nitrogen atom. Suitable alkaline condensing agents are for example, sodium, sodium hydride, and sodium ethylate. The ring closing condensations can be performed for example in alcohols such as ethanol or n-butanol or in benzene hydrocarbons at temperatures of about 80–150°. N.N-disubstituted anthranilic acid esters of the general formula IV are easily accessible for example by N-acylating and esterifying N-aryl-anthranilic acids. These acids are easily accessible in their turn for example by reacting alkali metal salts of o-halogen benzoic acids in the presence of copper powder or copper salts with aniline which may possibly be substituted. Examples are N-phenyl-anthranilic acid, N-(2-chlorophenyl)-, N-(3-chlorophenyl)-, N-(4-chlorophenyl)-, N-(2.4-dichlorophenyl)-, N-(2.5-dichlorophenyl)-, N-(4-bromophenyl)-, N-o-tolyl-, N-m-tolyl-, N-p-tolyl-, N-o-anisyl-, N-m-anisyl and N-(4-ethoxyphenyl)-anthranilic acid as well as N-phenyl-5-chloro-anthranilic acid.

The N-aryl-anthranilic acid is N-acylated advantageously before being esterified as the latter process must be performed under conditions in which, if there is an NH group present, N-alkylation can easily occur. The esterification, for example, can be performed by reacting an alkali metal salt of an N-acyl-N-aryl-anthranilic acid in the warm with dimethyl sulphate, diethyl sulphate or with a low molecular alkyl halide.

The 1-aryl-4-hydroxy-carbostyrils produced according to the present invention form salts with inorganic and organic bases, of which, for example, the alkali metal salts are easily water soluble.

The following examples serve to illustrate the production of the new compounds. Parts are given as parts by weight and their relationship to parts by volume is as that of grammes to cubic centimetres. The temperatures are in degrees centigrade.

EXAMPLE 1

The compounds given in the table are produced by heating equimolar amounts of monosubstituted malonic acid diethyl ester and diphenylamine, for example 17.4 parts of methyl malonic acid diethyl ester and 16.9 parts of diphenylamine. The components are heated for 4 hours at a bath temperature of 250–270° in a flask fitted with a distillation column which only allows the liberated alcohol to pass over. The residue is taken up in diluted sodium carbonate solution and benzene. The benzene is removed from the aqueous phase in the vacuum, the aqueous phase is boiled up with active charcoal and filtered. On acidifying the filtrate to a pH value of under 3, crystals separate out; they are recrystallised from the solvents given in the table.

Table

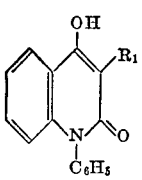

| $R_1$ | recrystallised from | M.P. |
|---|---|---|
| $CH_3$ | alcohol | >250° |
| $i$-$C_3H_7$ | benzene | 229° |
| $n$-$C_4H_9$ | ethyl acetate | 210° |
| cyclo-$C_6H_9$ | alcohol | >250° |
| $C_6H_5$ | benzene | 218° |
| $C_6H_5$-$CH_2$ | glacial acetic acid | >270° |

EXAMPLE 2

120 parts by volume of chloroform are added to 24.3 parts of N-(p-methoxy-phenyl)-anthranilic acid (produced according to Organic Syntheses Coll., vol. II, p. 15; crude substance melts at 172°) and 16 parts by volume of pyridine. At 0–5°, a solution of 13.4 parts of caproyl chloride in 27 parts by volume of chloroform is added dropwise and the reaction mixture is left to stand for 12 hours at room temperature. The reaction mixture is then shaken out with ice water and twice with diluted hydrochloric acid. The organic phase is concentrated in the vacuum. The oily N-caproyl-N-(p-methoxy-phenyl-anthranilic acid (36 parts) which remains is dissolved in 180 parts by volume of xylene. 40 parts by volume of this solution are distilled off to remove the remaining traces of chloroform and water. 2.4 parts of sodium hydride, in the form of a paste, are added and the whole is heated for 1 hour at 130°. 9.5 parts by volume of dimethyl sulphate are added dropwise at the same temperature and the mixture is kept for 4 hours at 130°. After cooling, the reaction mixture is shaken out twice with water and twice with diluted sodium carbonate solution. The organic phase is dried over sodium sulphate and the solvent is distilled off in the vacuum. The oily N-caproyl-N-(p-methoxy-phenyl-anthranilic acid methyl ester (30 parts) which remains is dissolved in 90 parts by volume of xylene, 2.0 parts of sodium hydride (as paste in xylene) are added and the whole is refluxed for 12 hours. After cooling, water is stirred in, the aqueous phase is again ethered out and the pH value is adjusted to under 3 while stirring. The crystals which precipitate are washed with water and dried. They are in an analytically pure state.

The 1-(p-methoxy-phenyl)-3-n-butyl-4-hydroxy-carbostyril melts at 213°.

On using 22.7 parts of N-(p-methyl-phenyl)-anthranilic acid, 1-(p-methyl-phenyl)-3-n-butyl-4-hydroxy-carbostyril is obtained in an analogous manner (M.P. 209–210°, from ethanol).

On using 24.6 parts of N-(p-chloro-phenyl)-anthranilic acid, 1-(p-chloro-phenyl)-3-n-butyl-4-hydroxy-carbostyril is obtained in an analogous manner (M.P. 247–248° from ethanol).

On using 25.6 parts of N-(p-ethoxy-phenyl)-anthranilic acid, also 1-(p-ethoxy-phenyl)-3-n-butyl-4-hydroxy-carbostyril is obtained in an analogous manner.

The compounds listed in Example 1 can also be produced in an analogous manner to that described in this example on using the corresponding acid chlorides.

EXAMPLE 3

If 23.6 parts of phenyl malonic acid diethyl ester or 26.6 parts of [p-methoxy-phenyl]-malonic acid diethyl ester are reacted with p.p'-dimethoxy-diphenylamine analogously to Example 1, then 1-(p-methoxy-phenyl)-3-phenyl-4-hydroxy-6-methoxy-carbostyril (M.P. 92–93° from ethanol) or 1.3-bis-(p-methoxy-phenyl-4-hydroxy-6-methoxy-carbostyril (M.P. 179–180° from ethanol) respectively are obtained.

Also analogously to Example 1, starting from 28.4 parts of [p-chloro-benzyl]-malonic acid diethyl ester, 1-phenyl - 3 - (p - chloro - benzyl - 4 - hydroxy - carbostyril (M.P. 241°) is obtained.

Also, analogously to Example 1, starting from 21.6 parts of n-butyl malonic acid diethyl ester and 32.7 parts of p-p'-dibromo-diphenylamine, 1-(p-bromo-phenyl)-3-n-butyl-4-hydroxy-6-bromo-carbostyril is obtained, starting from 23.6 parts of phenyl malonic acid diethyl ester and 19.7 parts of p.p'-dimethyl-diphenylamine, 1-(p-methyl - phenyl) - 3 - phenyl - 4 - hydroxy - 6 - methyl-carbostyril is obtained, starting from 23.6 parts of phenyl malonic acid diethyl ester and 23.7 parts of p.p'-dichloro - diphenylamine, 1 - (p - chloro - phenyl) - 3-phenyl-4-hydroxy-6-chloro-carbostyril is obtained, and starting from 24.2 parts of cyclohexyl malonic acid diethyl ester and 22.9 parts of p.p'-dimethoxy-diphenylamine, 1 - (p - methoxy - phenyl) - 3 - cyclohexyl - 4-hydroxy-6-methoxy-carbostyril is obtained.

On reacting 16.9 parts of diphenylamine with 29.2 parts of (p-isopropyl-benzyl)-malonic acid diethyl ester or with 28.0 parts of (p-methoxy-benzyl-malonic acid diethyl ester, 1-phenyl-3-(p-isopropyl-benzyl-4-hydroxy-carbostyril or 1-phenyl-3-(p-methoxy-benzyl)-4-hydroxy-carbostyril is obtained in the same manner.

What we claim is:
1. 1-phenyl-3-benzyl-4-hydroxy-carbostyril.
2. 1.3 - bis - (p - methoxy - phenyl) - 4 - hydroxy - 6-metoxy-carbostyril.

References Cited in the file of this patent

UNITED STATES PATENTS

| 2,542,850 | Glahn et al. | Feb. 20, 1951 |
| 2,838,441 | Allen et al. | June 10, 1958 |
| 2,844,510 | Lorenz et al. | July 22, 1958 |
| 2,895,956 | Tuppy | July 21, 1959 |
| 2,954,382 | Osbond | Sept. 27, 1960 |

FOREIGN PATENTS

| 287,803 | Germany | Mar. 17, 1914 |
| 490,274 | Germany | Feb. 3, 1930 |
| 512,720 | Germany | Nov. 14, 1930 |

OTHER REFERENCES

Chakravarti et al.: Journal Chemical Society (London), page 3337 (1953).

Ziegler et al.: Monatsch. Chem., vol. 90, pages 762–67 (1959).